Feb. 9, 1937. S. W. ALDERFER 2,070,388
APPARATUS FOR MAKING RUBBER TUBING OR THE LIKE
Original Filed Nov. 7, 1934 2 Sheets-Sheet 1
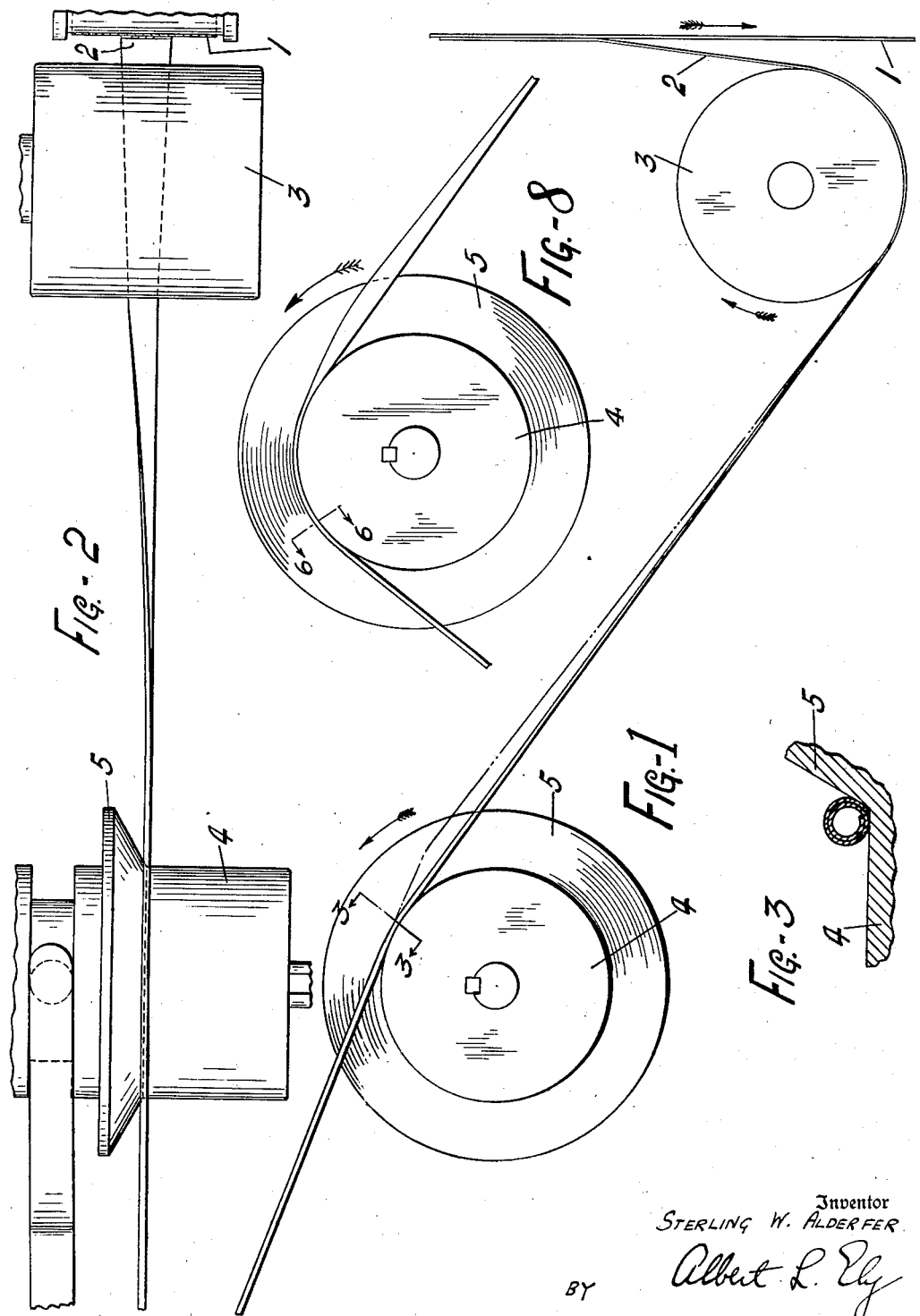
Inventor
STERLING W. ALDERFER
BY Albert L. Ely
Attorney Feb. 9, 1937.  S. W. ALDERFER  2,070,388
APPARATUS FOR MAKING RUBBER TUBING OR THE LIKE
Original Filed Nov. 7, 1934  2 Sheets-Sheet 2
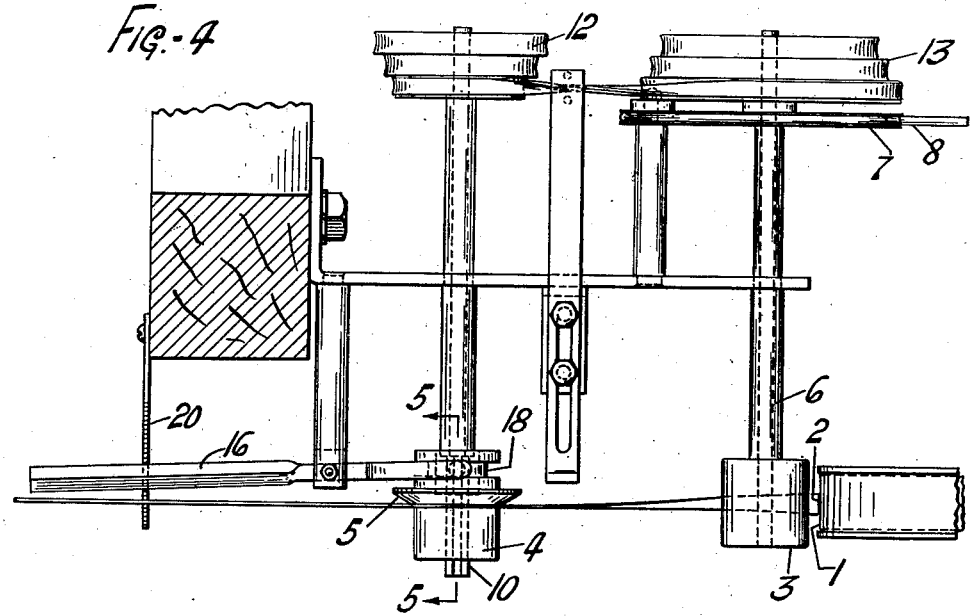
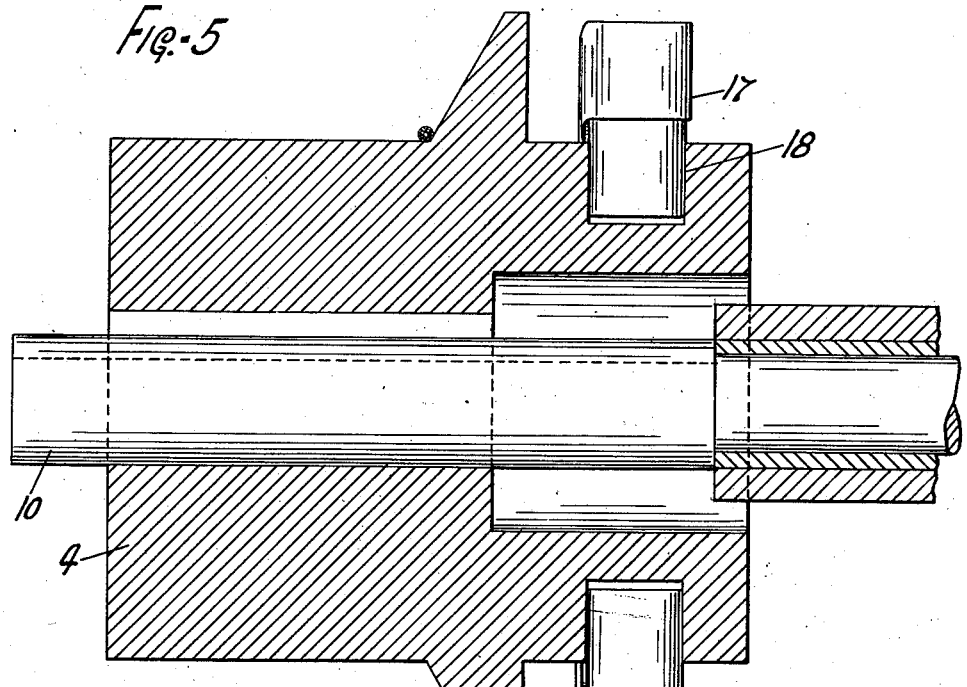
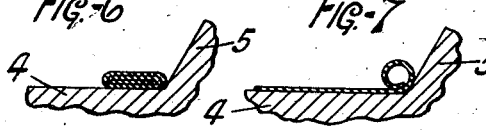
Inventor
STERLING W. ALDERFER
BY Albert L. Ely
Attorney Patented Feb. 9, 1937

2,070,388

UNITED STATES PATENT OFFICE 2,070,388

APPARATUS FOR MAKING RUBBER TUBING OR THE LIKE

Sterling W. Alderfer, Akron, Ohio, assignor of one-half to Edward D. Andrews, Akron, Ohio Original application November 7, 1934, Serial No. 751,857. Divided and this application October 17, 1935, Serial No. 45,387

7 Claims. (Cl. 154—6)

The present invention relates to the manufacture of hollow rubber tubing or similar articles directly from dispersions of rubber, either the natural latex or artificial dispersions of rubber.

For carrying out the invention either an unvulcanized latex may be employed, in which case the product is vulcanized after formation, or a vulcanized latex, in which case the tubing is delivered in completely vulcanized condition. By the use of the process, it is possible to obtain tubing of any desired size or bore and to make a flattened tape or to form a rubber tape with a selvage edge thereon.

The tubing which is made by the improved method is characterized by the fact that the edges of the tape do not encircle the finished tube in spiral lines, but are parallel with the axis of the tube. This makes a superior article as the grain of the rubber is lengthwise of the tube. The process has advantages in economy of manufacture and flexibility of operation. Rubber tubing may be made by the simple mechanical device illustrated and the operations are easily controlled.

In describing the process and in the claims, the generic term "latex" is used to designate the natural latex or an artificial rubber dispersion and is of sufficient breadth to cover these materials whether pre-vulcanized or not.

It will also be understood that while the invention is shown in its preferred form, so that one skilled in the art may readily understand and practice it, the invention is not limited or restricted to the operations specifically shown and described, but may be varied within the scope of the invention as set forth in the appended claims.

This case is a division of my copending application Serial No. 751,857, filed November 7, 1934.

In the drawings in which the best known method of practicing the invention is illustrated:

Figure 1 is a side elevation of the essential elements of the apparatus illustrating the method for making the round tubing;

Figure 2 is a plan view of the parts shown in Figure 1;

Figure 3 is an enlarged cross-section of the tube taken on the line 3—3 of Figure 1;

Figure 4 is a detail plan of the mechanism;

Figure 5 is a cross-section thereof on the line 5—5 of Figure 4;

Figure 6 is a cross-section on the line 6—6 of Figure 8 showing the flattening of the tube;

Figure 7 is a similar view, but showing the way in which a rubber tape with a rolled selvage edge may be obtained; and Figure 8 is a view showing the manner in which a flat tape is made.

In the operation of making tubing by the process shown and described, the latex is applied to a moving member, here shown as an endless belt 1, on which it is dried to form a flat tape 2. The method of forming a tape in this fashion is old and well known and the mechanism is not shown. The tape is removed from the belt after it has dried sufficiently to be self-sustaining and able to withstand the tension placed upon it during the subsequent steps of the process. The tape is removed from the belt by passing around a cylindrical roll 3, from where it is conducted to the turning member, here shown as the roll 4. This latter roll is provided with a flange 5 which is shown as tapered for the purpose of rolling the tape upon itself. This flange constitutes a member which is generally oblique to the plane of the tape, so that as the tape passes thereover, it will be rolled from edge to edge.

The roll 3 is mounted on a shaft 6 and is driven at any suitable speed by a pulley 7 and belt 8. The roll 3 is preferably driven at a peripheral speed in excess of the surface speed of the belt 1 so that a degree of stretch, which may be determined beforehand, is imparted to the tape with a consequent narrowing of the tape as indicated in Figure 4. The roll 4 is feathered to a shaft 10 which is driven by one of a series of stepped pulleys 12 from corresponding stepped pulleys 13 on the shaft 6, the connecting belt being shiftable to adjust the relative peripheral speeds of the rolls 3 and 4. It will be observed that the roll 4 is driven at a greater surface speed than the roller 3 so that the tape is stretched longitudinally between the rollers, decreasing its width and consequently the diameter and the bore of the finished tubing.

The roll 4 is adjustable axially by means of the pivoted lever 16, one end of which is formed with a yoke 17 engaging a groove 18 in the pulley. The other end of the lever is engaged by a detent 20 so that it may be held in any position of adjustment. The flange 5 may, therefore, be shifted to any position of adjustment with respect to the edge of the tape as it leaves the roll 3. If adjusted rearward sufficiently a flat tape will be secured. As the flange approaches the tape, the latter will be turned upon itself, rolling the edge over to form the tube as illustrated by the broken and full lines in Figure 1. By adjustment of the roll so that the base of the flange 5 is just inside the near edge of the tape, a tape with a rolled selvage end will be produced. By using two flanges on opposite sides of the roll, a tape with a double selvage end may be secured. By adjusting the flange until it is in alignment with the far edge of the tape, a full rolled tube will be secured.

It will be observed that the edges of the tape remain parallel to the longitudinal axis of the tube and the tape is not wound spirally on itself, but a true folding or turning action is secured with a straight seam down the tube. The tape is sufficiently tacky so that it will adhere to itself.

If the tube is led out from the roll 4 in a straight or substantially straight line, as shown in Figure 1, the tubular character of the product will be maintained. If, however, the tube is bent around the roll, as shown in Figure 8, the tube will be flattened out as shown in Figure 6, the air escaping along the tube between the rolls 3 and 4.

It will be seen that tubes of great varieties of diameters and bores may be secured by adjusting the tension from the time the tape leaves the belt 1 to the completion of the rolling operation, and the extent to which the tape is rolled may be varied by the axial adjustment of the roll 4. Flattened, rolled tapes may also be produced in varying widths and thicknesses and, finally, selvage edge tapes may be produced. By the method shown, the tape is rolled while unsupported so that the results secured may always be under control and variable at the will of the operator. The tape is also rolled upon itself under tension (which is also variable) so that the flexibility of the process is assured and the new and beneficial results are obtainable. The operation is simple and effective and does not require skilled labor or expensive equipment. Other advantages and benefits will be realized by the invention which may be carried on by modified steps and is not confined to the exact procedure outlined. The apparatus may also be varied and altered.

After the product is formed, it may be led directly to any suitable fabricating machinery, such, for example, as a golf ball winding machine or the like.

What is claimed is:

1. An apparatus for forming rubber tubing, comprising a moving element upon which a tape may be formed from rubber latex and spaced rolls for conducting the tape from said element, said rolls being run at progressively increasing peripheral speeds so as to stretch the tape longitudinally, and an inclined surface against which the tape rests to roll the tape from one edge.

2. An apparatus comprising a moving element upon which a tape may be formed from rubber latex, means for leading the tape from said element and tensioning it longitudinally, and a turning member having a surface oblique to the plane of the tape over which it runs and by which it is progressively rolled from edge to edge.

3. An apparatus comprising a moving element upon which a tape may be formed from rubber latex, means for leading the tape from said element, and a turning member having a surface oblique to the plane of the tape and spaced from the element a sufficient distance to permit the tape to roll upon itself progressively from edge to edge.

4. An apparatus comprising a moving belt upon which a tape may be formed from rubber latex and dried, a roll for conducting the tape from the belt, a second roll spaced therefrom, and a flange upon the second roll adapted to roll the tape progressively upon itself from edge to edge.

5. An apparatus comprising a moving belt upon which a tape may be formed from rubber latex, a roller for conducting the tape from the belt, a second roll spaced therefrom and having a surface speed greater than the first roll to stretch the tape longitudinally, and an inclined flange on the second roll against which the tape contacts and by which it is rolled progressively upon itself.

6. An apparatus comprising a moving member upon which a tape may be formed from rubber latex, a roller for conducting the tape from the belt and a second roller spaced therefrom, means for varying the relative peripheral speeds of the rollers to alter the tension upon the tape, and a tapered flange on the second roller to roll the tape from edge to edge progressively.

7. An apparatus comprising a moving member upon which a tape may be formed from rubber latex, a roller for conducting the tape from the belt and a second roller spaced therefrom, means for varying the relative peripheral speeds of the rollers to alter the tension upon the tape, and a tapered flange on the second roller to roll the tape from edge to edge progressively, the second roller being adjustable axially relative to the position of the tape.

STERLING W. ALDERFER.